(12) United States Patent
Abraham et al.

(10) Patent No.: US 9,396,041 B2
(45) Date of Patent: Jul. 19, 2016

(54) OPTIMIZATION OF RESOURCE USAGE IN A MULTI-ENVIRONMENT COMPUTING SYSTEM

(75) Inventors: Binu Abraham, Johnson, IA (US); Doris W. Ling, San Jose, CA (US); Ansuman Tapan Satpathy, Sunnyvale, CA (US); Judy C. Tsai, Los Altos, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 866 days.

(21) Appl. No.: 13/363,989

(22) Filed: Feb. 1, 2012

(65) Prior Publication Data

US 2013/0198367 A1    Aug. 1, 2013

(51) Int. Cl.
 *G06F 15/173* (2006.01)
 *G06F 9/50* (2006.01)
 *G06F 9/48* (2006.01)

(52) U.S. Cl.
 CPC ............ *G06F 9/5088* (2013.01); *G06F 9/4856* (2013.01); *G06F 9/5011* (2013.01)

(58) Field of Classification Search
 CPC ....... G06F 3/1415; G06F 13/14; G06F 21/74; H04W 36/365
 USPC ............. 718/1, 104; 713/1; 726/19; 719/313; 703/22; 709/226; 455/435.2; 370/401; 711/162
 See application file for complete search history.

(56) References Cited

U.S. PATENT DOCUMENTS

| | | | |
|---|---|---|---|
| 7,158,154 B2 | 1/2007 | Kim et al. | |
| 7,376,949 B2 | 5/2008 | Lowell et al. | |
| 8,615,589 B1* | 12/2013 | Adogla et al. | 709/226 |
| 8,898,443 B2* | 11/2014 | Reeves | G06F 13/14 713/1 |
| 2004/0039862 A1 | 2/2004 | Hunt et al. | |
| 2005/0227692 A1* | 10/2005 | Kawashima | H04W 36/365 455/435.2 |

(Continued)

FOREIGN PATENT DOCUMENTS

WO    2007035611 A2    3/2007

OTHER PUBLICATIONS mozillaZine: "Moving your profile folder", http://web.archive.org/web/20100207172041/, http://kb.mozillazine.org/Moving_your_profile_folder, Jan. 29, 2010, retrieved from the internet: URL:http://kb.mozillazine.org/Moving_your_profile_folder [retrieved on Jul. 5, 2012], all pages.

(Continued)

*Primary Examiner* — Dustin Nguyen
(74) *Attorney, Agent, or Firm* — McDermott Will & Emery LLP

(57) ABSTRACT

A method and apparatus for modifying resource usage by a computing system including a first environment and a second environment is disclosed. A status signal is received and applications executed by the first environment and by the second environment are monitored. The status signal may indicate whether the computing system is coupled to an external device. It is determined whether a first application is executed by the first environment and by the second environment. Responsive to determining the first application is executed by the first environment and by the second environment, an amount of resources allocated to the first application by each of the environments is calculated. Based on the first amount of resources allocated by the different environments, execution of the first application by the first environment or by the second environment is halted.

13 Claims, 5 Drawing Sheets

(56) References Cited

U.S. PATENT DOCUMENTS

| | | | |
|---|---|---|---|
| 2006/0106958 A1 | 5/2006 | Khawand et al. | |
| 2007/0171921 A1* | 7/2007 | Wookey | G06F 3/1415 370/401 |
| 2008/0307425 A1* | 12/2008 | Tripathi | 718/104 |
| 2009/0100425 A1* | 4/2009 | Russell | 718/1 |
| 2010/0031348 A1* | 2/2010 | Lam et al. | 726/19 |
| 2010/0082321 A1* | 4/2010 | Cherkasova et al. | 703/22 |
| 2010/0083248 A1* | 4/2010 | Wood et al. | 718/1 |
| 2010/0146513 A1 | 6/2010 | Song | |
| 2011/0016299 A1* | 1/2011 | Galicia et al. | 713/1 |
| 2011/0016301 A1 | 1/2011 | Galicia et al. | |
| 2011/0093691 A1 | 4/2011 | Galicia et al. | |
| 2011/0093836 A1 | 4/2011 | Galicia et al. | |
| 2011/0099403 A1 | 4/2011 | Miyata et al. | |
| 2011/0126216 A1 | 5/2011 | Galicia et al. | |
| 2011/0167421 A1 | 7/2011 | Soundararajan et al. | |
| 2011/0283291 A1 | 11/2011 | Tobe et al. | |
| 2012/0084791 A1* | 4/2012 | Benedek et al. | 719/313 |
| 2012/0173741 A1 | 7/2012 | Brittain et al. | |
| 2012/0233611 A1* | 9/2012 | Voccio | 718/1 |
| 2013/0111163 A1* | 5/2013 | Yang | G06F 21/74 711/162 |
| 2015/0154053 A1 | 6/2015 | Gangam et al. | |

OTHER PUBLICATIONS

Patent Cooperation Treaty, International Search Report and Written Opinion of the International Searching Authority for International Application No. PCT/US2011/067737, Aug. 1, 2012, 16 pages.

Patent Cooperation Treaty, International Search Report and Written Opinion of the International Searching Authority for International Application No. PCT/US2013/021370, Apr. 26, 2013, 11 pages.

\* cited by examiner

OPTIMIZATION OF RESOURCE USAGE IN A MULTI-ENVIRONMENT COMPUTING SYSTEM

FIELD OF THE DISCLOSURE

The present disclosure relates generally to mobile device systems, and more particularly to optimizing resource usage by a mobile device system including multiple environments.

BACKGROUND

Computing devices use operating systems to manage physical resources, applications and perform additional functions. Typically, operating systems are designed and optimized based on specific applications and user desired performance. Additionally, operating systems may also be customized to improve the performance of a specific hardware configuration or configurations. While different operating systems may operate better with different types of computing devices, it is desirable to have applications used by one operating system accessible to a different operating system.

Operating systems, such as LINUX® or WINDOWS®, configured for use by general-purpose computing devices (also referred to as a "general-purpose operating systems") have an extensive set of features such as file systems, device drivers, applications, libraries, etc. General-purpose operating systems allow concurrent execution of multiple programs, and attempt to optimize the response time (also referred to as latency time) and/or processor usage, or load, associated with the concurrently executing programs. However, operating systems configured for use by general-purpose computing devices are typically unsuitable for embedded real-time applications, such as use in mobile computing devices such as smartphones or tablet computers. In certain circumstances, however, it is desirable for a mobile computing device to combine the performance associated with a mobile computing device-specific embedded operating system and one or more features of a general-purpose operating system.

For example, LINUX® is a commonly-used general purpose operating system with many features that would also benefit mobile computing devices. However, LINUX® was not designed to be used as an embedded, or real-time, operating system for use by mobile computing devices. Currently, many devices, such as set top boxes, mobile phones and car navigation systems require features of a general purpose operating system, such as LINUX®, as well as features of an embedded, or real-time operating system, including real time performance.

Given that general-purpose operating systems offer certain benefits while embedded operating system offer other benefits, particularly when used by certain types of devices, such as mobile computing devices, implementing multiple operating systems on a single device allows a device to take advantage of benefits from different types of operating systems. Conventional methods for running multiple operating systems on a single device rely on virtualization techniques. However, because virtualization emulates a complete computing device, the emulated computing device implements and operates one or more software stacks. Additionally, emulation of a computing device introduces significant overhead, making conventional virtualization techniques impractical for certain types of devices, such as mobile devices.

Additionally, certain applications or services may be operable by multiple operating systems. In conventional approaches, an application or service may be concurrently executing in different operating systems, increasing the resources used by the application, which may impair overall performance For example, executing the same application in multiple operating systems decreases the memory available for other applications.

BRIEF DESCRIPTION OF THE FIGURES

The accompanying Figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
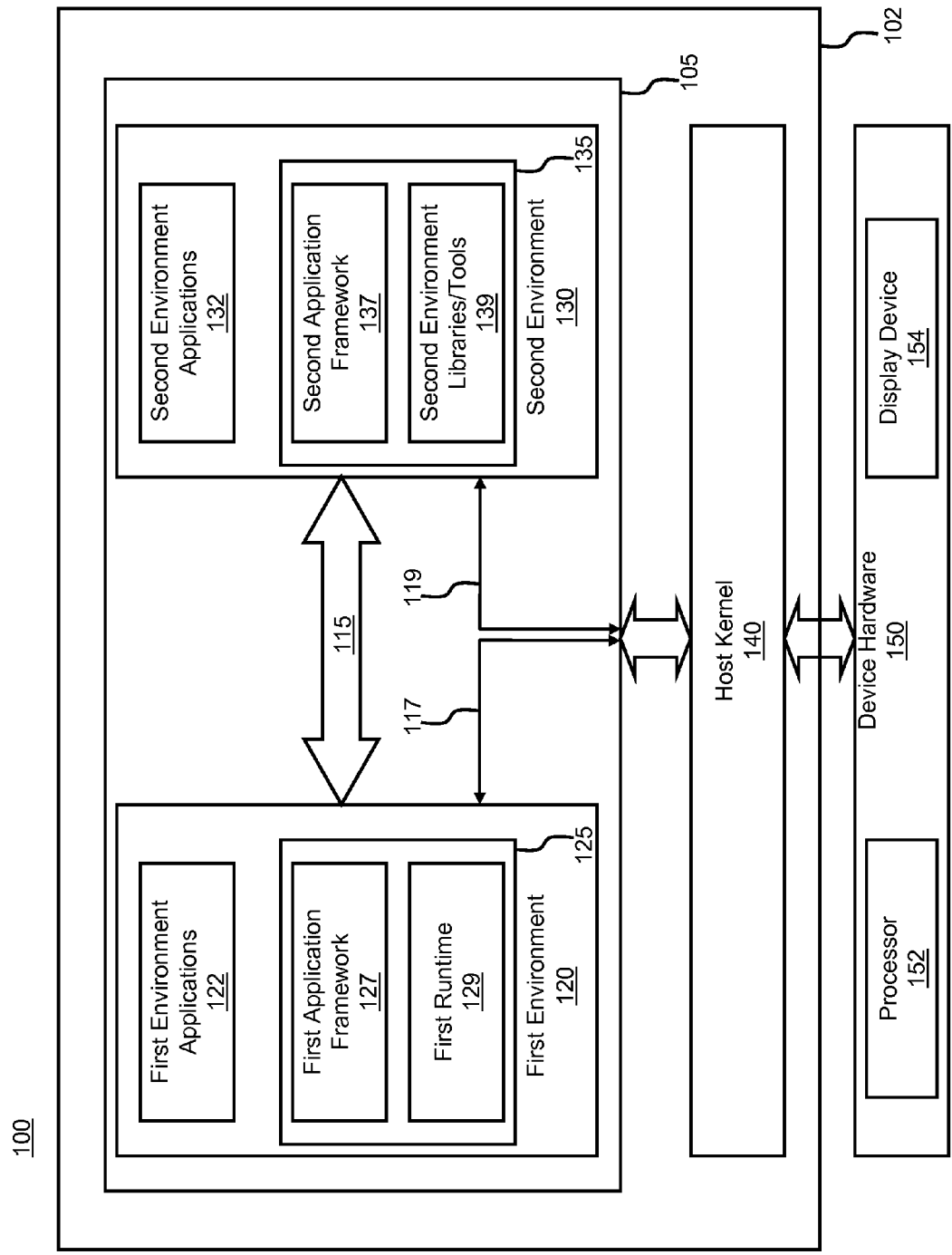
FIG. 1 is a block diagram of a mobile computing system including multiple environments in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

A method for modifying resource usage by a computing system including a first environment and a second environment is disclosed herein. A status signal is received and applications executed by the first environment and by the second environment are monitored. For example, the status signal indicates whether the computing system is coupled to an external device, such as a dock. It is determined whether a first application is executed by both the first environment and the second environment. Responsive to determining the first application is executed by the first environment and by the second environment, a first amount of resources allocated to the first application by the first environment is calculated and a second amount of resources allocated to the first application by the second environment is calculated. Based on the first amount of resources and the second amount of resources, execution of the first application by the first environment or by the second environment is halted. The first application continues to be executed by the other environment. In one embodiment, the first application is halted from being executed by the first environment responsive to the first amount of resources exceeding the second amount of resources. Alternatively, the first amount of resources and the second amount of resources are displayed and execution of the first application by the first environment is halted responsive to receiving a selection of the first amount of resources.

In the following description, for purposes of explanation, numerous specific details are set forth to provide a thorough understanding of the invention. However, it will be apparent to one skilled in the art that the invention can be practiced without these specific details. In other instances, structures and devices are shown in block diagram form in order to avoid obscuring the invention.

System Overview

FIG. 1 is a block diagram of a mobile computing system 100 including multiple environments in accordance with some embodiments. The mobile computing system 100 shown by FIG. 1 includes a host operating system 102 communicating with device hardware 150 using a host kernel 140. The host operating system 102 also includes a host user component 105 that communicates with the host kernel 140. In one embodiment, the host operating system 102 is a LINUX®, or similar, operating system, such as a GNU/Linux operating system. In such an embodiment, the host kernel 140 is a LINUX® kernel and the host user component 105 is a LINUX® user component. However, in other embodiments, a different type of kernel may be used as the host kernel 140.

The host user component 105 includes a first environment 120 and a second environment 130. Both the first environment 120 and the second environment 130 communicate with the host kernel 140. Hence, a single host kernel 140 is used by the first environment 120 and the second environment 130. In the example shown by FIG. 1, the first environment 120 communicates with the host kernel 140 via communication link 117 and the second environment 130 communicates with the host kernel 140 via communication link 119. In one embodiment, the host kernel 140 is a LINUX® kernel, the first environment 120 is an embedded environment, such as an environment used by mobile devices, while the second environment 130 is a general purpose operating system. For example, the host kernel 140 is a LINUX® kernel, the first environment 120 is an ANDROID™ environment and the second environment 130 is a GNU/Linux environment. However, in other embodiments, the first environment 120 and the second environment 130 may be any suitable operating environment. Either real-time or non-real time environments or operating systems may be employed by the first environment 120 or the second environment 130. While FIG. 1 shows an embodiment including a first environment 120 and a second environment 130, in other embodiments, a greater number of operating environments may be included in the host user component 105; thus, more than two environments may operate and coexist independently of each other using a single host kernel 140, as further described below. Additionally, the first environment 120 and the second environment 130 communicate with each other via communication link 115.

In one embodiment, the first environment 120 and the second environment 130 operate and coexist independently of each other. In certain embodiments, the first environment 120 and the second environment 130 are interdependent in at least some aspects of operation. For example, the first environment 120 and the second environment 130 interact with the host kernel 140 and compete for resources of the host kernel 140. As another example, the first environment 120 and the second environment 130 communicate data with each other using communication link 115, so the first environment 120 and the second environment 130 may operate in conjunction with one another for at least some operations or actions. The host kernel 140 allocates resources of the mobile computing system 100 by connecting and managing interaction between the device hardware 150 and the first middleware 125 and/or the second middleware 135.

However, for purposes of explanation, the first environment 120 and the second environment 130 are considered "independent" in that each of the environments 120, 130 is capable of operating by itself if the other environment is not present or is not operational. For example, the first environment 120 may operate if the second environment 130 is not present. As another example, one of the environments 120, 130 is operationally independent before the other environment 130, 120 is implemented using the host kernel 140. In some embodiments, the first environment 120 and the second environment 130 are "independent" in that each of the environments 120, 130 is a different type of environment serving different operations and functions performed via the host kernel 140, the device hardware 150 and other components such as users or additional devices. For example, the first environment 120 implements functions or operations commonly associated with an embedded operating system, such as an operating system used by a mobile computing device, while the second environment 130 implements functions or operations commonly associated with a general purpose operating system, such as an operating system used by a desktop or laptop computer.

FIG. 1 further illustrates example components used by the first environment 120 and example components used by the second environment 130. In one embodiment, the first environment 120 includes first environment applications 122 and first middleware 125, which communicates with the first environment applications 122. For example, if the first environment 120 is an ANDROID™ environment, the first environment applications 122 are configured to be executed by a Dalvik virtual machine. The first environment applications 122 include stacks and other suitable application components, and at least a subset of the first environment applications 122 are separable from one another. An application included in the first environment applications 122 comprises instructions that are recognizable by the first middleware 125, which operates in conjunction with a processor 152 to execute the instructions to provide one or more functions.

In the embodiment shown by FIG. 1, the first middleware 125 includes a first application framework 127 and a first runtime environment 129. However, in other embodiments, the first middleware 125 may include different and/or additional components, such as a radio interface module, a global positioning system (GPS) module or any other suitable component. The first environment applications 122 are managed by the first application framework 127 and interpreted by the first runtime environment 129. For example, the first runtime environment 129 includes an interpreter that translates an application from the first environment applications 122 during run-time of the application.

In an embodiment where the first environment 120 is an ANDROID™ environment, the first runtime environment 129 is a Dalvik register-based virtual machine (VM) that communicates with Dalvik libraries and/or tools in addition to additional components, such as the host kernel 140. The Dalvik libraries and/or tools are implemented on top of the host kernel 140 and implement functionality sufficient to execute the Dalvik register-based VM. In one embodiment, the Dalvik libraries are a subset of libraries supported by a GNU/Linux-based operating system and provide functionality optimized for implementation in mobile computing devices. This allows development of applications for execution by devices subject to more resource constraints than a desktop or laptop computer. A register-based virtual machine, such as the Dalvik register-based VM, is easier to optimize on a particular device hardware configuration than a virtual machine using a stack-based architecture (e.g., a virtual machine based on JAVA®). Further, an environment using a Dalvik, or similar, implementation replicates a complete middleware layer rather than merely replicating a byte-code interpreter, such as a virtual machine. Additionally, a Dalvik-based, or similar, implementation allows developers to design first environment applications 122 using a familiar syntax, such as a JAVA® syntax. Thus, in an embodiment where the first environment 120 includes first environment applications 122 prepared in Dalvik, or a similar configuration, the first environment applications 122 are byte-code interpreted applications.

In one embodiment, the second environment 130 includes second environment applications 132 and second middleware 135, which communicates with the second environment applications 132. In the embodiment shown by FIG. 1, the second middleware 135 includes a second application framework 137 and a second environment libraries and/or tools module 139. The second environment libraries and/or tools module 139 includes libraries for displaying data using a graphical user interface (GUI) and/or additional libraries or tools. However, in other embodiments, the second middleware 135 may include different and/or additional components, such as a desktop environment, a multimedia framework component, a window manager component or any other suitable component.

In one embodiment, the second environment applications 132 include one or more native applications that are comprised of instructions corresponding to the instruction set architecture of the host kernel 140 or the device hardware 150. One or more of the second environment applications 132 include a stack and/or additional components separate from other second environment applications 132. The second environment applications 132 are managed by the second application framework 137 and may use data and/or instructions from the second environment libraries and/or tools module 139 and/or other components included in the second middleware 135. An application included in the second environment applications 132 comprises instructions that are recognizable by the second middleware 135, which operates in conjunction with a processor 152 to execute the instructions to provide one or more functions. For example, if the second environment 130 is a GNU/Linux environment, the second environment applications 132 may be native applications using the instruction set of the host kernel 140, which may be implemented using GNU/Linux.

The first middleware 125 and the second middleware 135 are logically positioned between the first environment applications 122 and the second environment applications 132, respectively. The first middleware 125 and the second middleware 135 orchestrate interaction between the device hardware 150 and the first environment applications 122 and the second environment applications 132, respectively.

In the example shown by FIG. 1, the second environment 130 includes a plurality of logical memory partitions while the first environment comprises a single memory partition as well as system components. Further, in one embodiment, the second environment 130 and the host kernel 140 share a common instruction set. For example, the second environment 130 is a UBUNTU® stack, or a similar LINUX® stack. In an embodiment where the second environment 130 comprises a UBUNTU® stack, the host kernel 140 may also be implemented using UBUNTU®. However, in additional embodiments, the second environment 130 may alternatively comprise a different type of LINUX® environment, a SYMBAIN® environment, a WINDOWS® environment or another other suitable operating environment. For example, the second environment 130 may be a WINDOWS® environment and the host kernel 140 is also implemented using WINDOWS®. However, in other embodiments, the second environment 130 may comprise a single memory partition. Additionally, one or more additional environments may be included and may support one or multiple memory partitions. In additional embodiments, greater than two environments having a variety of different configurations independently coexist using the same host kernel 140.

In the embodiment shown by FIG. 1, the device hardware 150 comprises a processor 152 and a display device 154; however, in other embodiments the device hardware 150 includes different and/or additional components. In one embodiment, the device hardware 150 includes a computer-readable storage medium coupled to the processor 152. The computer-readable storage medium includes instructions that, when executed by the processor 152, execute one or more functions. Additionally, the device hardware 150 may include a communication device, such as a transceiver for wireless communication and/or a port for wired communication. In other embodiments, the device hardware 150 includes an audio output device, one or more input devices and/or any other suitable components.

The processor 152 processes data or instructions and may comprise various computing architectures. For example, the processor 152 may process data or instructions using a complex instruction set computer (CISC) architecture a reduced instruction set computer (RISC) architecture, an architecture implementing a combination of instruction sets or any other suitable instruction set. Although FIG. 1 shows a single processor 152, in other embodiments, the mobile computing system 100 may include multiple processors. The processor 152 transmits, processes and/or retrieves data from the first environment 120 and/or from the second environment 130 and/or from additional components.

The display device 154 is a device displaying electronic images and/or data. For example, the display device 154 comprises an organic light emitting diode display (OLED), a liquid crystal display (LCD) or any other device such as a monitor. In one embodiment, the display device 154 includes a touch-sensitive transparent panel for receiving data or allowing other interaction with the images and/or data displayed by the display device 154.

Figure 2:
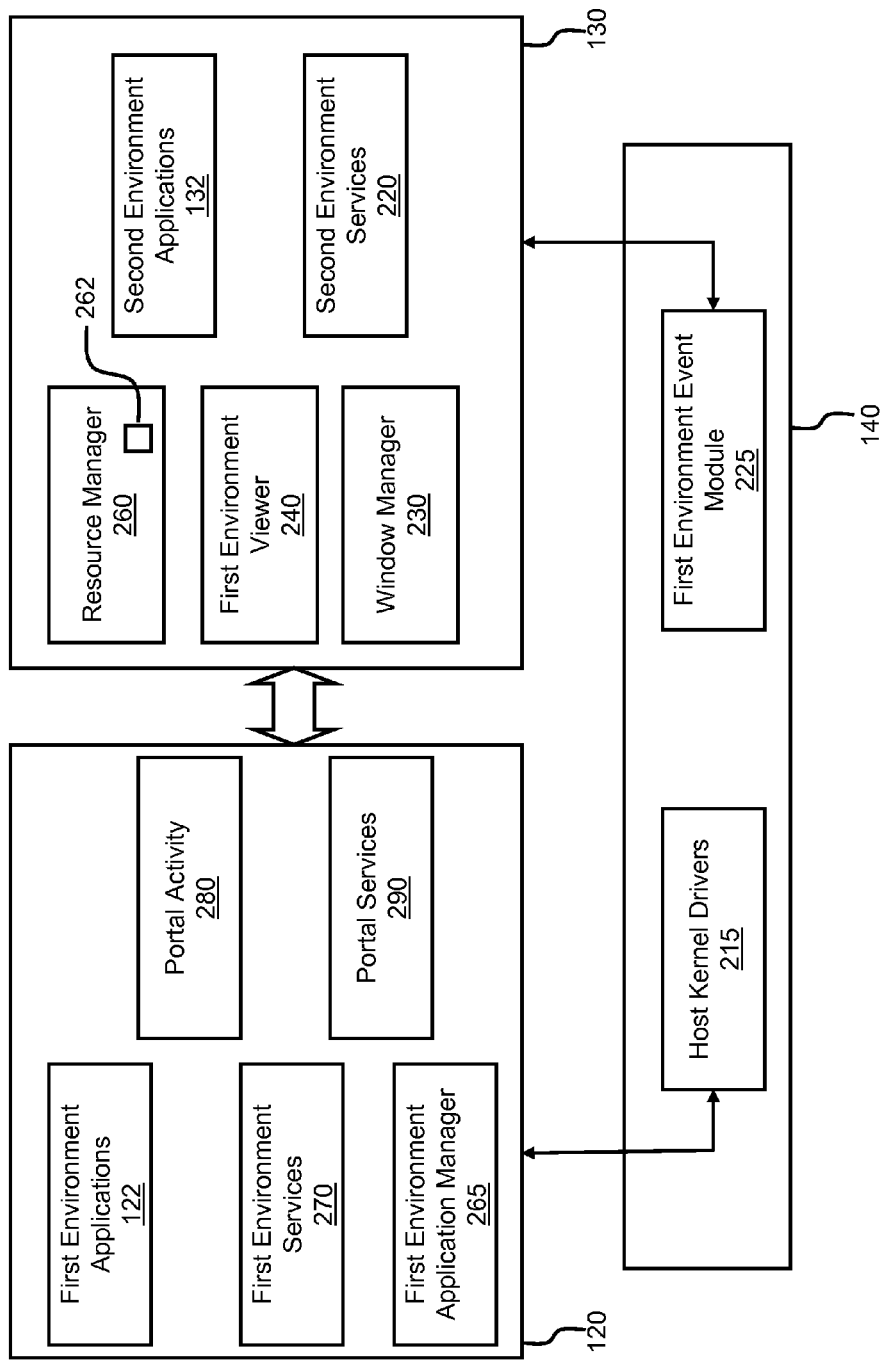
FIG. 2 is a block diagram of additional components of a mobile computing system including multiple environments in accordance with some embodiments.

FIG. 2 is a block diagram of additional components of a mobile computing system 100 including multiple environments in accordance with some embodiments. In the embodiment shown by FIG. 2, the first environment 120 and the second environment 130 communicate with a host kernel 140. FIG. 2 illustrates the host kernel 140 including host kernel drivers 215 and a first environment event module 225. The host kernel drivers 215 include device drivers for one or more components of the device hardware 150. However, in other embodiments, the host kernel 140 includes different and/or additional modules.

FIG. 2 shows components of the first environment 120 and of the second environment 130 in addition to the components depicted by FIG. 1. In the embodiment illustrated by FIG. 2, the first environment 120 includes a first environment application manager 265, a first environment services module 270, a portal activity module 280 and a portal services module 290 in addition to the first environment applications 122. In an alternative embodiment, the portal activity module 280 is included in the first environment applications 122. Further, in one embodiment, first environment application manager 265, the first environment services module 270 and the portal services module 290 are included in the first middleware 125, which is further described above in conjunction with FIG. 1.

Also, FIG. 2 shows components included in the second environment 130 in addition to those components further described above in conjunction with FIG. 1. In the embodiment shown by FIG. 2, the second environment 130 includes a window manager 230, a first environment viewer 240, a resource manager 260 and a second environment services module 220 in addition to the second environment applications 132. In one embodiment, one or more of the second environment services module 220, the window manager 230, the first environment viewer 240 and the resource manager 260 are included in the second middleware 135, further described above in conjunction with FIG. 1. In another embodiment, the first environment viewer 240 is included in the second environment applications 132.

The first environment viewer 240 displays a window including data and/or an application from the first environment on an interface displayed on a display device 154 when the second environment 130 is the primary environment. For example, the first environment viewer 240 displays a window showing one or more applications executed by the first environment 120 in a graphical user interface displayed when the second environment 130 is the primary environment. This allows a user to view and interact with the first environment 120 via the displayed window while the second environment 130 is the primary environment.

The first environment event module 225 communicates with the first environment viewer 240 and receives coordinate events, keyboard events or other events received by the first environment viewer 240. The received invents are communicated by the first environment event module 225 to an event hub. For example, the first environment event module 225 receives absolute coordinate and/or keyboard events from the first environment viewer 240. In one embodiment, the event hub communicates the received events to the first environment 120 or to one or more first environment applications 122.

The window manager 230 comprises instructions that, when executed by the processor 152, display data from the first environment 120 and/or the second environment 130 using the display device 154. The window manager 230 generates one or more windows in which data and/or an application is displayed. Additionally, the window manager 230 receives input from a user to modify the size, shape or location of a window displayed using the display device 154. For example, the window manager 230 receives input from a user to resize a window, such as an input repositioning a border of the window to increase or decrease the size of the displayed window.

The first environment application manager 265 comprises one or more instructions that, when executed by the processor 152, identify applications and/or services executed by the first environment 120. In one embodiment, the first environment application manager 265 also determines the amount of resources used by the applications and/or services executed by the first environment 120. For example, the first environment application manager 265 includes application identifiers associated with applications executed by the first environment 120 and associates an amount of resources used by the application corresponding to an application identifier. Examples of resource usage that is measured include memory or processor time.

In one embodiment, the first environment application manager 265 also communicates with the host kernel drivers 215 and receives data indicating whether the mobile computing system 100 is coupled to an external device via the device hardware 150. For example, the first environment application manager 265 receives data from the host kernel drivers 215 and generates a status signal indicating whether the mobile computing system 100 is coupled to a dock or another external device. In one embodiment, the first environment application manager 265 receives data from the host kernel drivers 215 and analyzes the received data to generate the status signal. For example, the status signal has a first value responsive to the device hardware 150 being coupled to a dock and a second value responsive to the device hardware 150 not being coupled to a dock.

The portal services module 290 comprises one or more instructions that, when executed by a processor 152, enable one or more services for the first environment 120 and/or manage communication with the resource manager 260 included in the second environment 130. In an embodiment where the first environment 120 is executed by a mobile computing device, the portal services module 290 is executed while the mobile computing device is operating. The portal services module 290 is also coupled to the portal activity module 280 and also receives broadcast events associated with the first environment 120.

The portal activity module 280 comprises computer readable instructions that, when executed by the processor 152, represent one or more applications included in the second environment 130. For example, if the second environment 130 is a UBUNTU® environment, the portal activity module 280 represents a specific UBUNTU® application. When the portal activity module 280 is accessed, the application included in the second environment 130 is displayed on a display device 154, allowing the application included in the second environment 130 to be viewed and/or accessed from the first environment 120.

Generally, multiple applications in an environment 120, 130 are capable of executing simultaneously in what is commonly referred to as a "stack" of executing applications. As discussed herein, the topmost application in a stack is deemed to have "focus." Where multiple applications are available for access by a user, the application currently receiving input commands or data from a user is considered to be the application having "focus." For example, if multiple windows corresponding to different applications are displayed on a display device 154, the application associated with the window currently receiving input from the user is the application having "focus." In an embodiment, the second environment 130 enables display of multiple applications at a given time while the first environment 120 enables display of a single application at a time. For example, the second environment 130 allows multiple windows associated with different applications to be displayed at one time while the first environment 120 allows display of a single window associated with an application at one time. However, in alternative embodiments, the first environment 120 and the second environment 130 display different numbers of applications at a given time.

As further described above in conjunction with FIG. 1, the first environment 120 and the second environment 130 communicate with each other and also communicate with a single host kernel 140. In one embodiment, as described above in conjunction with FIG. 1, the first environment 120 includes a Dalvik register-based virtual machine replicating a complete middleware layer rather than merely replicating a byte-code interpreter, creating a possibility of conflict in the operation of the first middleware 125 and the second middleware 135 allocating resources through the host kernel 140 without appropriate steps. To avoid potential conflicts in resource allocation by the host kernel 140, the resource manager 260, included in the second environment 130, communicates directly with the portal services module 290 included in the first environment 120 and vice versa.

The resource manager 260 included in the second environment 130 comprises instructions that, when executed by the processor 152, manage resources shared by the first environment 120 and the second environment 130. For example, the resource manager 260 manages use of resources such as the display device 154, one or more input devices, a power supply, additional output devices and other suitable resources by the first environment 120 and the second environment 130. Further, the resource manager 260 maintains state information associated with the mobile computing system 100. The resource manager 260 also controls access to the device hardware 150 by the first environment 120 and the second environment 130. For example, the resource manager 260 identifies and/or modifies whether a user interface associated with the first environment 120 or with the second environment 130 is displayed using the display device 154.

In the embodiment shown by FIG. 2, the resource manager 260 includes a docking manager 262, which comprises instructions that, when executed by the processor 152, determines whether the mobile computing system 100 is coupled to dock or to another external device. For example, the docking manager 262 receives a status signal from the first environment application manager 265 and analyzes the status signal to determine whether the mobile computing system 100 is coupled to an external device. In one embodiment, the status signal is a binary value having a first value when the mobile computing system 100 is coupled to an external device and having a second value when the mobile computing system 100 is not coupled to an external device. Alternatively, the status signal has multiple values associated with different external devices and the docking manager 262 compares a value of the status signal to stored values to identify the external device to which the mobile computing system 100 is coupled.

Responsive to the docking manager 262 receiving a status signal from the first environment application manager 265 indicating the mobile computing system 100 is coupled to a dock, the resource manager 260 monitors applications executed by the first environment 120 and by the second environment 130. The resource manager 260 determines whether a first application is being executed by both the first environment 120 and by the second environment 130. For example, the resource manager 260 determines whether an application identifier or application name is identified as being executed by the first environment 120 and by the second environment 130. If the resource manager 260 determines that the first application is being executed by both the first environment 120 and by the second environment 130, the resource manager determines the amount of resources allocated to the first application by the second environment 130 and communicates with the first environment application manager 265 to determine the amount of resources allocated to the first application by the first environment 120. For example, the resource manager 260 determines an amount of memory allocated to the first application by the first environment 120 and an amount of memory allocated to the first application by the second environment 130.

In one embodiment, the resource manager 260 compares the amount of resources allocated to the first application by the first environment 120 to the amount of resources allocated to the first application by the second environment 130 and halts execution of the first application by the environment that allocates the largest amount of resources to the first application. For example, if the first environment 120 allocates more resources to the first application than the second environment 130, the resource manager 260 halts execution of the first application by the first environment 120, while continuing execution of the first application by the second environment 130. Alternatively, the resource manager 260 generates a message identifying the resources allocated to the first application by the different environments and receives an input selecting the environment to halt execution of the first application. For example, responsive to a selection of the second environment 130, the resource manager halts execution of the first application by the second environment 130.

When the resource manager 260 halts execution of the first application in an environment, the resource manager 260 also transfers data and/or context associated with the first application from the environment in which execution of the first application is halted to the environment in which execution of the first application continues. For example, if a web browser is halted in the first environment 120, form data and/or uniform resource indicators (URIs) currently used by the web browser in the first environment are transferred to the web browser executed in the second environment 130. As an additional example, if a video viewing application is halted in the second environment 130, the video being viewed and the current location within the video is transferred to the video viewing application executing in the first environment 120. This allows users to preserve data when the environment in which an application is changed while also conserving resources by executing an application in a single environment.

In one embodiment, the portal services module 290 receives data for communication from the first environment 120 to the resource manager 260 included in the second environment 130. Further, the portal services module 290 receives data from the resource manager 260 that is communicated to the first environment 120 from the second environment 130. In one embodiment, the resource manager 260 also includes a status-discoverable application programming interface (API) to the portal services module 290. The status-discoverable API may be called by the resource manager 260 at anytime. Additionally, the resource manager 260 obtains and processes run-time status to maintain a state machine. In one embodiment, for the first environment 120, the portal services module 290 provides run-time status to processes. Similarly, the portal services module 290 requests and receives status updates from processes that provide status information. In one embodiment, the portal services module 290 is included in the first runtime environment 129.

The resource manager 260 provides run-time status to processes in the second environment 130 requesting and/or requiring run-time status. In one embodiment, the host kernel drivers 215 communicate with the resource manager 260 as well as processes providing run-time status information. For example, the status-discoverable API of the resource manager 260 arbitrates access to user interface devices, such as the display device 154, a touch screen, a graphical user interface or a similar user interface device. As another example, the status-discoverable API arbitrates access to power supplies, such as a battery or another power source.

As discussed above, in conjunction with FIG. 1, the first environment 120 and the second environment 130 are independent form each other and co-exist with respect to each other. Each of the first environment 120 and the second environment 130 is a fully functioning environment that does not rely upon the other environment to function. Unlike conventional configurations, the first environment 120 and the second environment 130 do not co-exist in a virtualization or emulation scheme. Rather, the first environment 120 and the second environment 130 both operate on a single, shared host kernel 140. The first environment 120 and the second environment 130 have run-time coexistence in which both the first environment and the second environment 130 are run as stand-alone, native environments. Neither the first environment 120 nor the second environment 130 is recompiled as a common run-time environment, such as a C run-time environment, is not leveraged for both environments. Because of the first environment 120 and the second environment 130, a user is capable of accessing an application that is configured for operation on one of the environments without interrupting an interaction with another environment.

Figure 3:
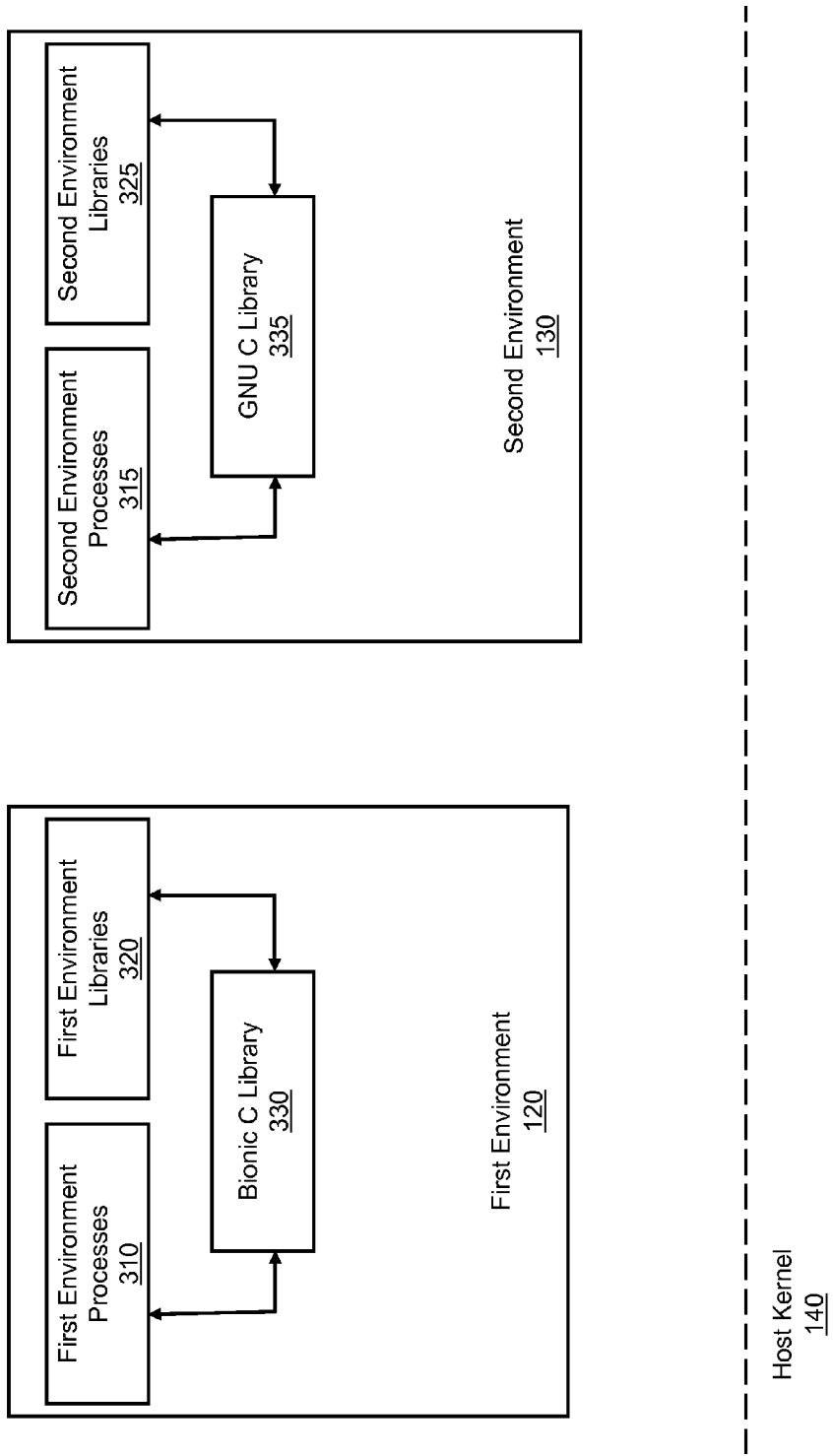
FIG. 3 is a block diagram of an example run-time coexistence schema in accordance with some embodiments.

FIG. 3 is a block diagram of an example run-time coexistence schema in accordance with some embodiments. In the example shown by FIG. 3, the first environment 120 is an ANDROID™ environment and the second environment 130 is a UBUNTU® environment. Generally, the first environment 120 and the second environment 130 operate in a separate run-time environment providing services for applications and/or processes while the mobile computing system 100 is operating.

In the embodiment shown by FIG. 3, first environment processes 310 and first environment libraries 320 access a Bionic C library 330, which is optimized and modified for the first environment 120. In one embodiment, the first environment libraries 320 and the Bionic C library 330 are included in the first runtime environment 129. Also in the embodiment shown by FIG. 3, second environment processes 315 and second environment libraries 325 communicate with a GNU C library 335. In one embodiment, the second environment libraries 325 and the GNU C library 335 are included in the second environment libraries and/or tools module 139. Thus, the first environment 120 and the second environment 130 each operate using its respective C library without conflicting with the library used by the other environment 130, 120.

Methods

Figure 4:
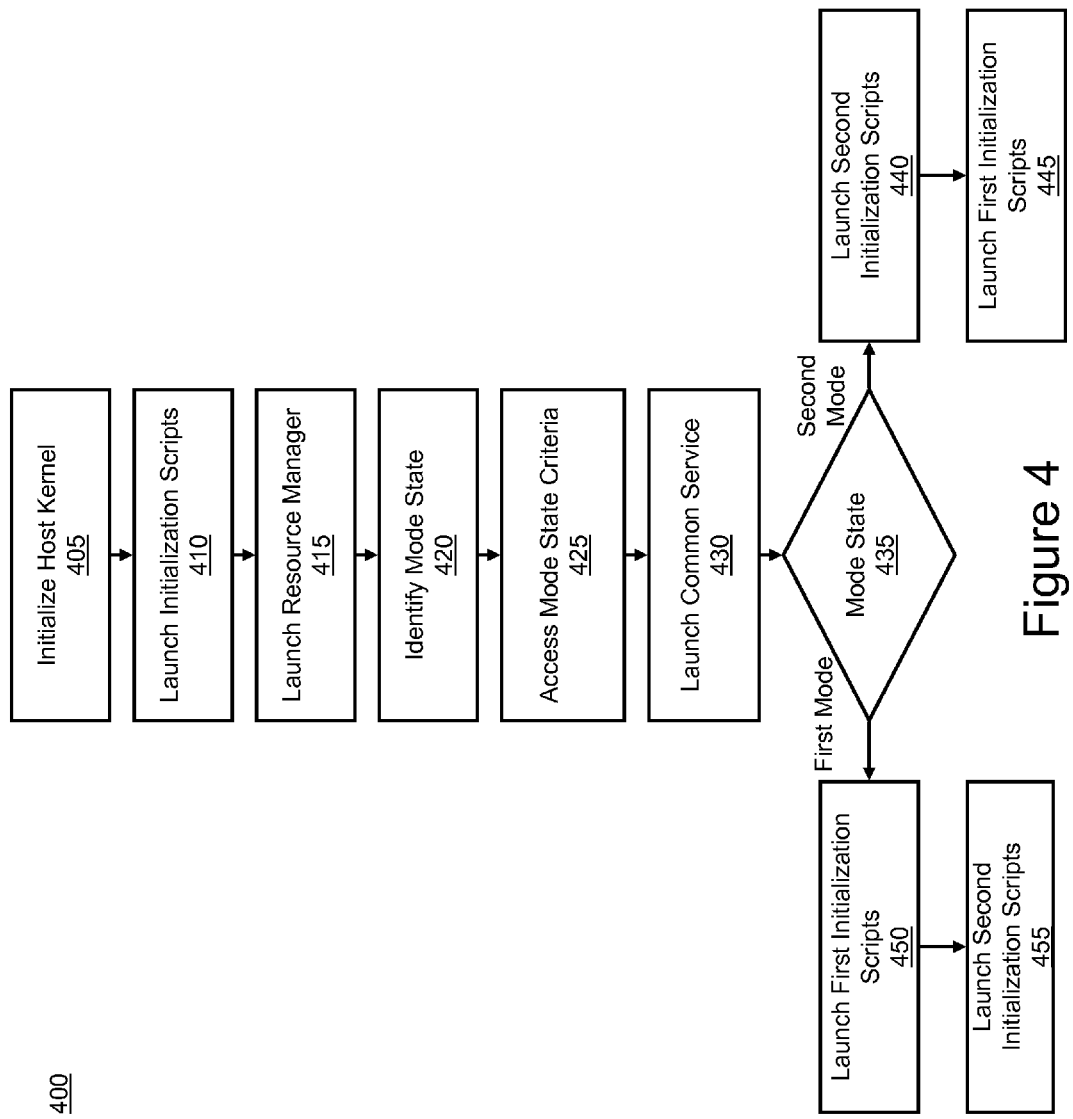
FIG. 4 is a flow chart of a method for booting a mobile computing system including multiple environments in accordance with some embodiments.

FIG. 4 is a flow chart of a method 400 for booting a mobile computing system 100 including multiple environments in accordance with some embodiments. In one embodiment, the steps of the method 400 are implemented by instructions for performing the described actions embodied or stored within a computer-readable storage medium, such as a flash memory or a random access memory, that are executable by a processor, such as the processor 152. Additionally, the method 400 may be implemented in embodiments of hardware, software or combinations of hardware and software. Moreover, in some embodiments, the method 400 includes different and/or additional steps than those shown by FIG. 4.

The method 400 includes environment-specific steps and steps performed by different environments. However, the boot sequence may be modified based on rules associated with a predetermined device state of the mobile computing system 100 dictating the booting sequence. For example, if the mobile computing system 100 is coupled to a peripheral device, such as a monitor, the mobile computing system 100 operates in a second mode where the second environment 130 is the default primary environment. Alternatively, if the mobile computing system 100 is not coupled to a peripheral device, the mobile computing system 100 operates in a first mode where the first environment 120 is the default primary environment.

While one of the first environment 120 or the second environment 130 acts as a primary environment, both environments are launched simultaneously or nearly simultaneously. Additionally, once the first environment 120 and the second environment 130 are launched and one of the environments serves as the primary environment, the secondary environment operates in the background relative to the primary environment, in case the state changes and the secondary environment becomes the primary environment. For example, when the mobile computing system 100 is in the second mode and the peripheral is unplugged, there is an automatic transition to the first mode, resulting in the secondary environment becoming the primary environment and vice versa.

In the embodiment shown by FIG. 4, the host kernel 140 is initialized 405. For example, a bootloader program is launched or initialized. After initialization, the host kernel 140 launches 410 initialization scripts and launches 415 the resource manager 260. After launching 415 the resource manager, the mode state is identified 420, and a reference library is accessed 425 to determine criteria associated with the identified mode or criteria dictated by the identified mode.

Services common to the first environment 120 and the second environment 130 are then launched 430 and the identified mode state is determined 435. Responsive to determining 435 that a first mode is identified, initialization scripts associated with the first environment 120 are launched 450 and then initialization scripts associated with the second environment 130 are launched 455. Hence, in the first mode, the first environment 120 operates as the primary environment while the second environment operates as the secondary environment.

Responsive to determining 435 that a second mode is identified, initialization scripts associated with the second environment 130 are launched 440 then initialization scripts associated with the first environment 120 are launched 445. Thus, in the second mode, the second environment 130 operates as the primary environment, while the first environment 120 operates as the secondary environment.

However, regardless of which environment is the primary environment, both the first environment 120 and the second environment 130 are launched and become operational before the mobile computing system 100 is operational. Further, because services common to the first environment 120 and the second environment 130 are launched 430 prior to the environment-specific initialization scripts, the primary and secondary environments are essentially launched in parallel. However, primary environment-specific services are launched before services specific to the secondary environment. By separating launching 430 of common services from environment-specific initialization scripts, the mobile computing system 100 is able to quickly become operational with multiple co-existing and independent environments. While both the primary environment and secondary environment are executing when the mobile computing system 100 is operational, the secondary environment operates in the background relative to the primary environment. Either the first environment 120 or the second environment 130 may be the primary environment; additionally, the primary environment may be switched to the secondary environment automatically or responsive to user commands.

Figure 5:
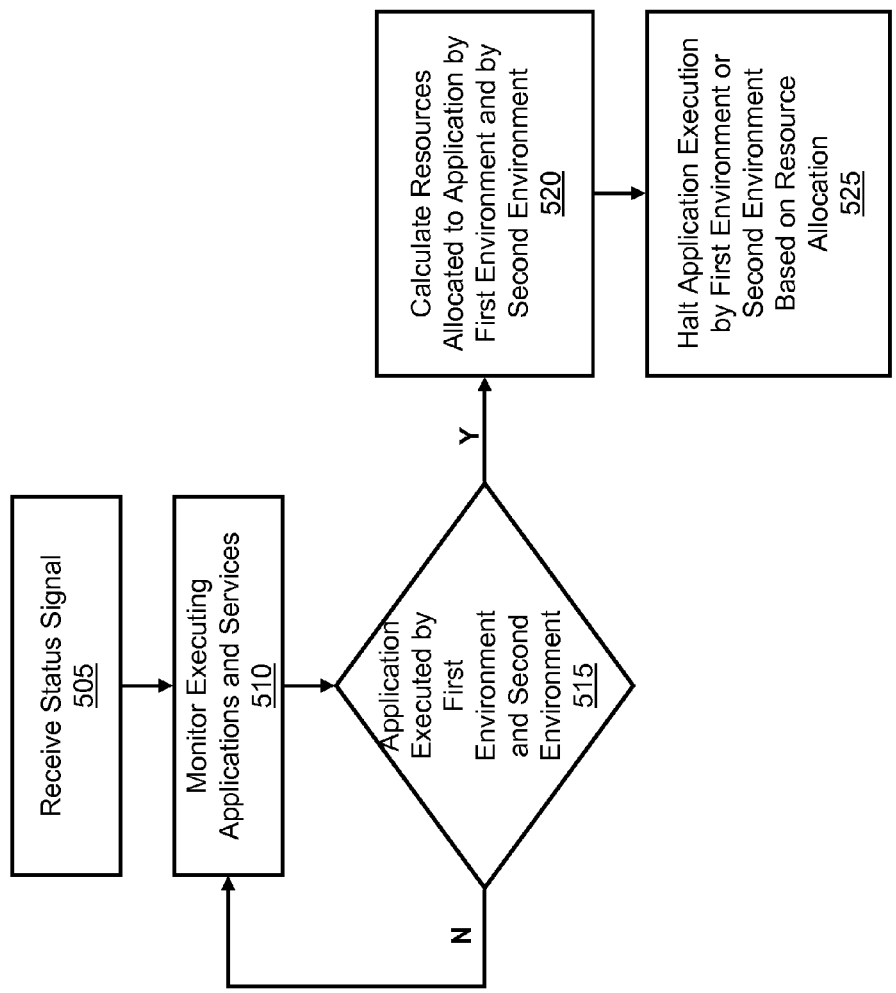
FIG. 5 is a flow chart of a method for conserving resources used by the mobile computing system in accordance with some embodiments.

FIG. 5 is a flow chart of a method 500 for conserving resources used by the mobile computing system 100 in accordance with some embodiments. In one embodiment, the steps of the method 500 are implemented by instructions for performing the described actions embodied or stored within a computer-readable storage medium, such as a flash memory or a random access memory, that are executable by a processor, such as the processor 152. Additionally, the method 500 may be implemented in embodiments of hardware, software or combinations of hardware and software. Moreover, in some embodiments, the method 500 includes different and/or additional steps than those shown by FIG. 5.

In the embodiment shown by FIG. 5, a docking manager 262 included in a resource manager 260 executing in the second environment 130 receives 505 a status signal from the first environment application manager 265 and analyzes the status signal to determine whether the mobile computing system 100 is coupled to an external device. In one embodiment, the status signal is a binary value having a first value when the mobile computing system 100 is coupled to an external device and having a second value when the mobile computing system 100 is not coupled to an external device. Alternatively, the status signal has multiple values associated with different external devices and the docking manager 262 compares a value of the status signal to stored values to identify the external device to which the mobile computing system 100 is coupled.

Responsive to the docking manager 262 receiving 505 a status signal from the first environment application manager 265 indicating the mobile computing system 100 is coupled to a dock, the resource manager 260 monitors 510 applications executed by the first environment 120 and by the second environment 130. The resource manager 260 determines applications being executed by the second environment 130 and the resources used by execution of the applications being executed by the second environment 130. Also, the resource manager 260 exchanges data with the first environment application manager 265 to determine applications being executed by the first environment 120 and the resources used by execution of the applications being executed by the first environment 120.

The resource manager 260 determines 515 whether a first application is being executed by both the first environment 120 and by the second environment 130. For example, the resource manager 260 determines 515 whether an application identifier or application name is identified as being executed by the first environment 120 and by the second environment 130. Responsive to determining 515 the first application is not executed by both the first environment 120 and the second environment 130, the resource manager 260 continues to monitor 510 the applications and/or services executed by the first environment 120 and by the second environment 130. However, responsive to determining 515 the first application is being executed by both the first environment 120 and by the second environment 130, the resource manager 260 calculates 520 the amount of resources allocated to the first application by the second environment 130 and communicates with the first environment application manager 265 to calculate 520 the amount of resources allocated to the first application by the first environment 120. For example, the resource manager 260 calculates 520 an amount of memory allocated to the first application by the first environment 120 and an amount of memory allocated to the first application by the second environment 130.

Responsive to the first application being executed by both the first environment 120 and by the second environment 130, the resource manager 260 halts 525 execution of the first application by either the first environment 120 or by the second environment 130 based on resource usage by the different environments. In one embodiment, the resource manager 260 compares the amount of resources allocated to the first application by the first environment 120 to the amount of resources allocated to the first application by the second environment 130 and halts 525 execution of the first application by the environment allocating the largest amount of resources to the first application. For example, if the first environment 120 allocates more resources to the first application than the second environment 130, the resource manager 260 halts 525 execution of the first application by the first environment 120, while continuing execution of the first application by the second environment 130. Alternatively, the resource manager 260 generates a message identifying the resources allocated to the first application by the different environments and receives an input selecting the environment to halt 525 execution of the first application. For example, responsive to a selection of the second environment 130, the resource manager halts 525 execution of the first application by the second environment 130.

When the resource manager 260 halts 525 execution of the first application in an environment, the resource manager 260 also transfers data and/or context associated with the first application from the environment in which execution of the first application is halted to the environment in which execution of the first application continues. For example, if a web browser is halted 525 in the first environment 120, form data and/or uniform resource indicators (URIs) currently used by the web browser in the first environment are transferred to the web browser executed in the second environment 130. As an additional example, if a video viewing application is halted 525 in the second environment 130, the video being viewed and the current location within the video is transferred to the video viewing application executing in the first environment 120. This allows users to preserve data when the environment in which an application is changed while also conserving resources by executing an application in a single environment.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "ha . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. In some embodiments, a combination of the two approaches may be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions, programs and/or integrated circuits with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   monitoring, using instructions executed by a processor, applications executed by a first environment and applications executed by a second environment;
   determining that a first application is executed by the first environment and by the second environment;
   responsive to determining that the first application is executed by the first environment and by the second environment, calculating a first amount of resources allocated to the first application by the first environment and calculating a second amount of resources allocated to the first application by the second environment;
   halting execution of the first application in one or more memory partitions of the first environment or in one or more memory partitions of the second environment based on the first amount of resources and the second amount of resources; and
   transferring data from the first application on the first environment to the second environment if the first amount of resources exceeds the second amount of resources or data from the first application on the second environment to the first environment if the second amount of resources exceeds the first amount of resources.

2. The method of claim 1, wherein halting execution of the first application in the one or more memory partitions of the first environment or in the one or more memory partitions of the second environment based on the first amount of resources and the second amount of resources comprises:
   responsive to the first amount of resources exceeding the second amount of resources, halting execution of the first application in the one or more memory partitions of the first environment.

3. The method of claim 1, wherein halting execution of the first application in the one or more memory partitions of the first environment or in the one or more memory partitions of the second environment based on the first amount of resources and the second amount of resources comprises:
   displaying the first amount of resources and the second amount of resources; and
   responsive to receiving a selection of the first amount of resources, halting execution of the first application by the first environment.

4. The method of claim 1, further comprising:
   receiving a status signal indicating a mobile computing system including the processor is coupled to a docking station.

5. An apparatus comprising:
   a processor;
   a computer-readable storage medium coupled to the processor, the computer-readable storage medium including instructions that, when executed by the processor, cause the processor to:
   monitor applications executed by the processor in a first environment and applications executed in a second environment;
   determine whether a first application is executed by the first environment and by the second environment;
   responsive to determining the first application is executed by the first environment and by the second environment, calculate a first amount of resources allocated to the first application by the first environment and calculating a second amount of resources allocated to the first application by the second environment;
   halt execution of the first application by the processor in one or more memory partitions of the first environment or in one or more memory partitions of the second environment based on the first amount of resources and the second amount of resources; and
   transfer data from the first application on the first environment to the second environment if the first amount of resources exceeds the second amount of resources or data from the first application on the second environment to the first environment if the second amount of resources exceeds the first amount of resources.

6. The apparatus of claim 5, wherein halt execution of the first application by the processor in the one or more memory partitions of the first environment or in the one or more memory partitions of the second environment based on the first amount of resources and the second amount of resources comprises:
   responsive to the first amount of resources exceeding the second amount of resources, halt execution of the first application by the processor in the first environment.

7. The apparatus of claim 5, wherein halt execution of the first application by the processor in the one or more memory partitions of the first environment or in the one or more memory partitions of the second environment based on the first amount of resources and the second amount of resources comprises:

display the first amount of resources and the second amount of resources on a display device; and responsive to receiving a selection of the first amount of resources, halt execution of the first application by the processor in the first environment.

8. The apparatus of claim 5, wherein the instructions further cause the processor to:

receive a status signal indicating a coupling to a docking station.

9. A non-transitory computer readable storage medium coupled to a processor, the non-transitory computer readable storage medium including instructions that, when executed by the processor, cause the processor to:

monitor applications executed by a first environment and applications executed by a second environment;

determine whether a first application is executed by the first environment and by the second environment;

responsive to determining the first application is executed by the first environment and by the second environment, calculate a first amount of resources allocated to the first application by the first environment and calculate a second amount of resources allocated to the first application by the second environment;

halt execution of the first application in one or more memory partitions of the first environment or in one or more memory partitions of the second environment based on the first amount of resources and the second amount of resources; and transfer data from the first application on the first environment to the second environment if the first amount of resources exceeds the second amount of resources or data from the first application on the second environment to the first environment if the second amount of resources exceeds the first amount of resources.

10. The non-transitory computer readable storage medium of claim 9, wherein halt execution of the first application in the one or more memory partitions of the first environment or in the one or more memory partitions of the second environment based on the first amount of resources and the second amount of resources comprises:

responsive to the first amount of resources exceeding the second amount of resources, halt execution of the first application in the one or more memory partitions of the first environment.

11. The non-transitory computer readable storage medium of claim 9, wherein halt execution of the first application in the one or more memory partitions of the first environment or in the one or more memory partitions of the second environment based on the first amount of resources and the second amount of resources comprises:

display the first amount of resources and the second amount of resources; and responsive to receiving a selection of the first amount of resources, halt execution of the first application in the one or more memory partitions of the first environment.

12. The non-transitory computer readable storage medium of claim 9, wherein the instructions further cause the processor to:

receive a status signal indicating a portable computing device including the processor is coupled to a docking station.

13. The method of claim 1, wherein the execution of the first application in the first environment is halted while the execution of the first application is continued in the second environment.

* * * * *